Oct. 16, 1945. R. B. HITCHCOCK ET AL 2,387,071
HARVESTER REEL MOUNTING
Filed March 8, 1943 2 Sheets-Sheet 1

Inventors:
Rex B. Hitchcock
and Arthur H. Ketter,
By Paul O. Pippel
Attorney.

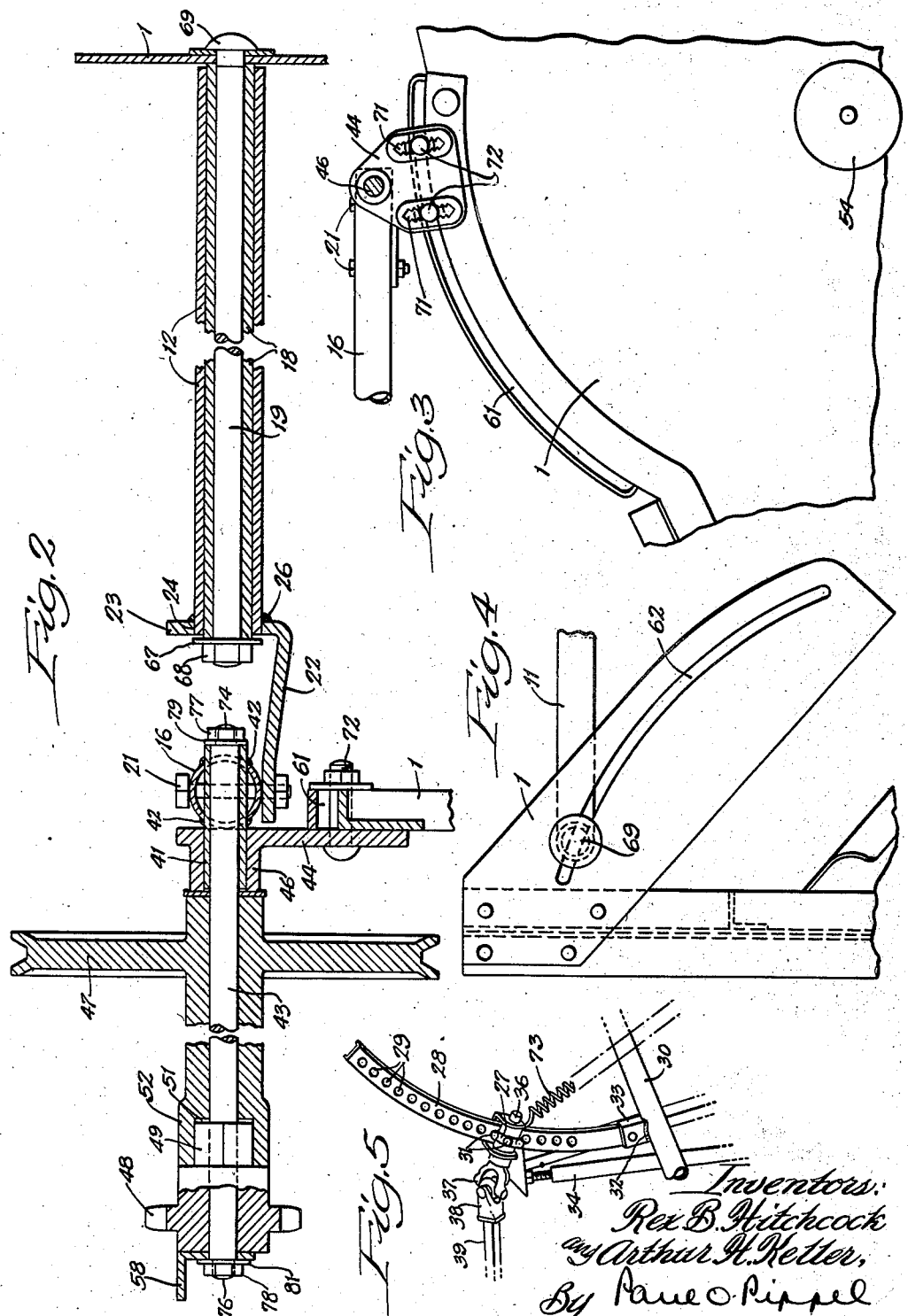

Patented Oct. 16, 1945

2,387,071

UNITED STATES PATENT OFFICE 2,387,071

HARVESTER REEL MOUNTING

Rex B. Hitchcock, Evanston, and Arthur H. Keller, Moline, Ill., assignors to International Harvester Company, a corporation of New Jersey Application March 8, 1943, Serial No. 478,379

13 Claims. (Cl. 56—222)

This invention relates to a new and improved harvester reel mounting and has for one of its principal objects the provision of means for adjusting the reel forwardly and rearwardly in combination with vertical adjustment.

An important object of this invention is to provide a horizontal reel adjustment completely made on one side of the machine. Heretofore, harvesters having reels capable of being adjusted fore and aft required adjustment from both ends of the reel, preferably simultaneously. It will be seen that two men were thus required to make the reel adjustment, or, when one man attempted to make the adjustment, he would of necessity be running from one end to the other end, this operation being repeated until the reel was properly alined in its end bearing slots. The device of this invention eliminates the multiplicity of points of adjustment and moves all adjustments to one central location, whereby a single operator may adjust the reel with ease.

Another important object of this invention is the provision of horizontal adjustment for a harvester reel, wherein the driving mechanism for the reel remains in constant adjustment throughout the entire range of adjustability.

A further object of this invention is to provide horizontal and vertical reel adjustment, and means whereby either type of adjustment may be made separately from the other.

Other and further important objects of this invention will become apparent from the disclosures in the following specification and accompanying drawings, in which:

Figure 2 is a sectional view taken on the line 2 of Figure 1;

Figure 3 is a sectional view taken on the line 3 of Figure 1;

Figure 4 is a partial end view taken in the direction indicated by the arrow 4 in Figure 1, showing the reel support; and Figure 5 is a detail perspective of the mechanism for effecting vertical adjustment of the harvester reel.

Figure 1:
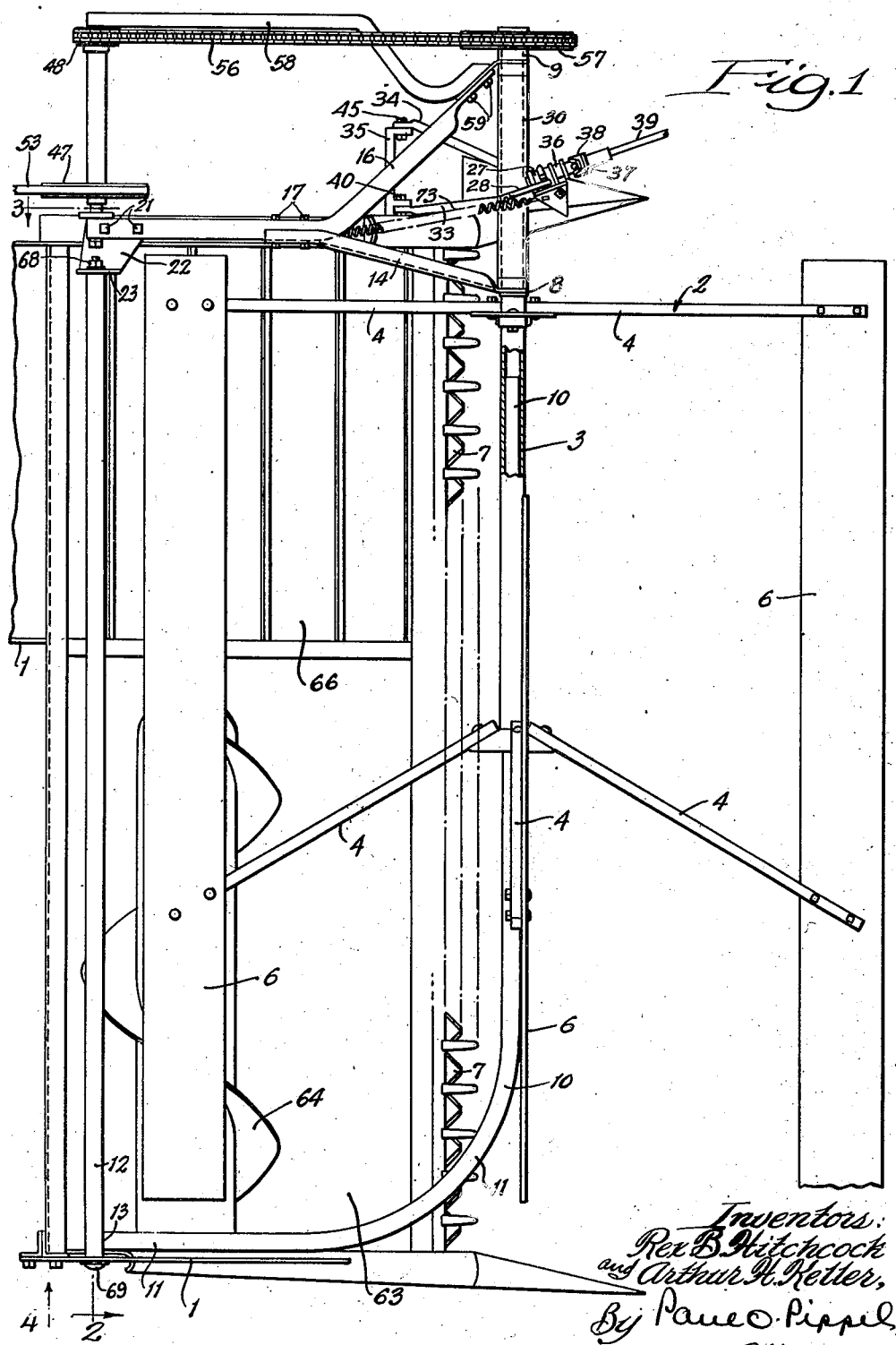
Figure 1 is a partial top plan view of a harvester showing the forward end.

As shown in the drawings, the reference numeral 1 designates generally the structural frame portions of a harvester having a reel 2 consisting of a shaft 3 for its axis of rotation and radially extending arms 4 for the support of paddles or the like 6, which are adapted to feed the standing grain to the cutting mechanism of the harvester shown at 7 on the forward end of a platform 63.

It is desirable to have this grain-feeding reel vertically adjustable in order that it may be used efficiently for any type of grain, whether it be of the tall or short variety. A reel of fixed height will not properly feed grains having stalks of various heights to the cutting elements. Further, reels having a fixed position horizontally with respect to the cutting elements will not properly feed different types of grain to the cutting elements regardless of the availability of vertical adjustment, and for that reason the harvester reel of this invention has been designed for both horizontal and vertical adjustment.

Some harvester reels are only provided with a support at their drive end, as shown by the alined bearings 8 and 9, respectively. However, the reel sleeve shaft 3 shown herein is journally supported at its outer end by the telescoping member 10, as best shown in Figure 1. The member 10 has a right angle extension, as shown at 11, which is rigidly attached to the pivotable member 12 at 13.

The reel shaft bearings 8 and 9 are formed in the outer ends of supporting members 14 and 16, respectively. The member 14 is shown rigidly affixed to the member 16 by means of bolts 17, but the particular means of attachment may be any suitable type. The means of obtaining vertical adjustment of the reel without changing its drive mechanism is accomplished by swinging the reel 2 about the shaft 12.

As best shown in Figure 2, the shaft 12 is an outer sleeve which surrounds an inner sleeve 18 and a central shaft 19 running therethrough. The reel support 16 projects rearwardly toward the reel-pivoting shaft 12 and is bolted by a bolt 21 to a bracket 22, which forms an integral extension to the end of the reel pivot shaft 12. The bracket 22 is angularly shaped, having a vertical extension 23 which is adapted to form a socket 24, into which the sleeve member 12 projects, and the members 12 and 23 located against further relative movement by means of a weld 26 or the like.

As best shown in Figures 1 and 5, the means for obtaining rotatable movement of the reel about the shaft 12 is in the form of a pinion 27 and arcuate rack 28. The rack 28 having apertures 29 for the reception of the pinion teeth 31 is connected to the reel shaft 3 by being welded at 32 or by any other suitable means of attachment to the sleeve 30 within which the sleeve shaft 3 is journally rotatable. The pinion 27, as best shown in Figure 1, is supported by members 33 and 34 hinged for slight swinging movement at 40 and 45 to a rigid supporting bracket 35 extending laterally of the harvester platform 63. The hinged arms 33 and 34 are inclined forwardly and extend beneath the sleeve 30. The hinging of the arms 33 and 34 is necessary in order to effect a raising and a lowering of the reel about the arcuate rack 28. The pinion 27 is adapted to be rotated about its axis 36, which forms one portion of a universal joint, as shown at 37. The mating portion of the universal joint, namely 38, is the end of an arm 39 which leads to a point adjacent the operator on the tractor, whereby rotation of the arm 39 by means of a crank or the like (not shown) causes the pinion 27 to rotate and the rack 28 to move upwardly or downwardly, depending upon the direction of rotation. Vertical movement of the rack 28 causes similar movement of the shaft 3 and therefore of the entire reel. A lifting or a lowering of the reel causes a rotation of the sleeve 12 and its integral bracket 22 about the inner sleeve 18. It will be seen that the sleeve 12 is slightly shorter than the inner sleeve 18, and therefore is free to rotate thereon. The tubular reel-supporting member 16 is equipped with a sleeve 41 running through and at right angles thereto. The sleeve member 41 is welded, or otherwise attached, to the member 16, as shown at 42. An internal shaft 43 is adapted to be positioned centrally of the sleeve 41 and, inasmuch as the sleeve 41 is formed integrally with the reel-supporting member 16, the sleeve 41 rotates about the shaft 43 upon vertical adjustment of the reel 2. The shaft 43 has reduced threaded ends 74 and 76 for reception of the nuts 77 and 78 over end-thrust washers 79 and 81, respectively. A bracket 44, having a hub 46, rotates freely over the sleeve 41 and adjacent the member 16. A sheave 47 and a sprocket 48 are mounted upon the shaft 43 and rotate freely thereon and have interlockable engagement with each other by means of the polygonal extension 49 of the sprocket 48 extending within a similarly shaped polygonal socket 51 within a hub 52 of the sheave 47.

As best shown in Figures 1 and 3, the sheave 47 is driven by a V-belt 53 from a sheave 54. The sheave 47 in turn drives the sprocket 48, and, as shown in Figure 1, a chain 56 extends between the sprocket 48 and a sprocket 57 keyed to the reel axis shaft 3. The outer end of the short shaft 43 is additionally supported by means of an angle member 58 which extends between the shaft 43 to a point where it is rigidly attached to the tubular reel supporting member 16 at 59 by means of bolts or the like. It will be seen upon raising or lowering of the reel shown herein that, inasmuch as the vertical movement is in the form of an arc about the elements 12—22—41—58, the length of the driving chain 56 will always remain constant eliminating previously undesirable length adjustments.

This vertical adjustment has now been augmented by horizontal adjustment, wherein the shaft 19 and the bracket 44 are capable of being adjusted along the length of slots 61 and 62 shown respectively in Figures 3 and 4. The slot 61 is positioned in the harvester framework at the drive end of the reel, and the slot 62 is positioned in an oppositely disposed portion of the frame at the far end of the reel drive. It will be noted that the slots 61 and 62 are concentric and in the form of radial arcs, so that, when the reel 2 is adjusted forwardly or rearwardly with respect to the cutting elements 7, the platform 63, the auger conveyor 64, and a belt conveyor 66, the drive V-belt 53 between the sheaves 54 and 47 will always remain a constant length.

In order that an operator of a harvester of this type may have full and easy control of this fore and aft reel adjustment, we have provided a central location where all adjustments may be made. This central location is at the drive end of the reel and within the area defined by the bracket 44 and the end of the sleeve shaft 12. The reel supports 19 and the bracket 44 must be rigidly affixed within the slots 62 and 61, respectively, in order that the reel will be operable in one adjusted position. Therefore, it is necessary that fastening means be employed so that such adjustment may be made relatively permanent. In order that the adjustment and fastening means for the slot 62 may be made from the central adjusting location, the sleeve 18 is employed intermediate the harvester frame 1 and a washer 67, so that a nut 68 may be drawn up on the threaded end of the shaft 19 to such a degree that the sleeve 18 is tightly pinched between the members 1 and 67, and a head 69 being an integral part of the shaft 19 is drawn tightly against the housing 1 and thereby prevents movement of the shaft 19 along the slot 62.

At the drive end of the reel, the bracket 44, best shown in Figure 3, is equipped with a pair of apertures 71, through which bolts or the like 72 are adapted to lock the bracket 44 to the frame 1 at any adjusted position within the slot 61. Inasmuch as the bracket 44 depends below the center of the shaft 19, it will be evident that the arcuate slot 61 is described by a smaller radius than the slot 62, in order that the shafts 19 and 43 remain at right angles to the frame.

It will be seen that herein is provided an easily adjusted harvester reel capable of being vertically adjusted from the tractor drive position. The operator is aided in overcoming the weight of the reel by means of a helping spring 73, which is connected at one end to the reel support 16 and at its other end to the upper end of the pinion supports 33 and 34. The employment of superposed sleeves 12 and 18 enables the operator to make the reel adjustments at one end of the machine and also permits vertical movement at such time when the reel supports are rigidly fastened within the arcuate slots 61 and 62.

We are aware that numerous details of construction may be varied through a wide range without departing from the principles disclosed herein, and we, therefore, do not propose limiting the patent granted hereon otherwise than as necessitated by the prior art.

What is claimed is:

1. A harvester comprising a frame having opposed slots therein, a reel, a member supported within said slots, supporting means for said reel attached to said member, said member comprising a pair of spaced apart alined shafts, a bracket therebetween, sleeves surrounding said shafts, a radially extending flange at the end of one of said shafts, and means for pinching one of said superposed sleeves between the flange at the end of the shaft on which it is mounted and the frame, whereby adjustment of said member along the length of the slots in said frame is accomplished at one side of the harvester.

2. A harvester comprising a frame having opposed concentric arcuate slots therein, a reel, a member associated with the arcuate slots in said frame adapted to accommodate horizontal and vertical reel adjustment, supporting means for said reel attached to said member, said member comprising a shaft having an annular flange at the end thereof, a sleeve surrounding said shaft, and means for pinching said sleeve between the end flange of said shaft and said frame, whereby said shaft may be adjusted within the slots from a single side of the harvester.

3. A harvester comprising a frame having a pair of opposed concentric arcuate slots therein, a reel, a shaft therefor, a member supported within said slots, said member comprising a pair of spaced apart alined shafts, a sleeve shorter than and surrounding one of said shafts, an end thrust member adapted to be moved along said shaft, means for pinching said sleeve between the end thrust member and the frame for adjustment of the shaft in one of said arcuate slots, a second sleeve shorter than and surrounding the first-named sleeve, a bracket positioned intermediate the pair of shafts, a rigid connection between said bracket and said second sleeve, and supporting means between the reel and said second shaft and bracket respectively.

4. A harvester comprising a frame having a pair of opposed concentric arcuate slots therein, a reel, a shaft therefor, a member supported within said pair of slots, said member comprising a pair of spaced apart alined shafts, a sleeve shorter than and surrounding one of said shafts, an end thrust member adapted to be moved along said shaft, means for pinching said sleeve between the end thrust member and the frame for adjustment of the shaft in one of said arcuate slots, a second sleeve shorter than and surrounding the first-named sleeve, a bracket positioned intermediate the pair of shafts, a rigid connection between said bracket and said second sleeve, supporting means for the reel positioned between the reel and said second shaft and bracket respectively, a short sleeve surrounding the other of said shafts, a second bracket journally supported on said last-named short sleeve, and means for adjustably fastening said second bracket in the other of said arcuate slots.

5. A harvester comprising a frame having a pair of spaced apart arcuate slots, a reel, a shaft therefor, a member supported within said slots, said member comprising a pair of separated alined shafts, a sleeve shorter than and surrounding one of said shafts, a washer adapted to slide on said shaft, means for pinching said sleeve between said washer and said frame for adjustment of the shaft in one of said arcuate slots, a second sleeve shorter than and surrounding the first-named sleeve, a bracket positioned intermediate the pair of shafts, a rigid connection between said bracket and said second sleeve, supporting means for the reel, connecting means between said supporting means and said second shaft and said bracket, a short sleeve surrounding the other of said shafts, a second bracket journally supported on said last-named short sleeve, means for adjustably fastening said second bracket in the other of said arcuate slots, and driving means for said reel, said driving means including driven and driving members operable as a unit on the other of said shafts positioned adjacent said short sleeve.

6. A harvester comprising a frame having opposed concentric arcuate slots, a reel, a shaft therefor, a member supported within said slots, said member comprising a pair of spaced apart alined shafts, a sleeve shorter than and surrounding one of said shafts, an end thrust member adapted to slide on said shaft, means for tightening said sleeve between the end thrust member and the frame for adjustment of the shaft in one of said arcuate slots, a second sleeve shorter than and surrounding the first-named sleeve, a bracket positioned intermediate the pair of shafts, a rigid connection between said bracket and said second sleeve, supporting means between the reel and said second shaft and bracket, a short sleeve surrounding the other of said shafts, a second bracket journally supported on said last-named short sleeve, means for adjustably fastening said second bracket in the other of said arcuate slots, driving means for said reel, said driving means including driven and driving members operable as a unit on the other of said shafts positioned adjacent said short sleeve, a driving member supported on said frame at a point corresponding to the radial center of said arcuate slots, a driven member on said reel shaft, flexible members joining said driving and driven members, whereby the flexible members maintain a constant length regardless of adjustment, and provision for fore and aft adjustment is on one side of the harvester.

7. A harvester comprising a frame, a reel mounted for movement with respect to said frame, driving means for said reel, said driving means comprising pulleys, belts, sprockets, and chains, means associated with said frame for effecting arcuate horizontal reel adjustment, said means for effecting arcuate horizontal reel adjustment comprising reel-supporting means, said frame having opposed concentric arcuate slots, and means for fastening said reel supporting means at selected points along the length of the slots from one side of said frame.

8. A harvester comprising a frame, a reel, driving means for said reel, said driving means comprising pulleys, belts, sprockets, and chains, means for effecting arcuate vertical reel adjustment, said means comprising reel-supporting means, a pivotable member mounted on said frame, said reel-supporting means associated with said pivotable member, means for effecting arcuate horizontal reel adjustment, said means comprising a pair of opposed concentric arcuate slots in said frame, and said pivotable member adjustably affixed to said slots, whereby the reel may be vertically adjusted through an arc described by the reel-supporting means swinging about the pivotable member, and the said reel may be adjusted horizontally through an arc described by the arcuate slots in the frame, resulting in constant length belt and chain drive members.

9. A harvester comprising a frame having an arcuate slot therein, a reel adjustably mounted both vertically and horizontally with respect to said frame, the said reel having a central shaft, a sprocket on said shaft, supporting members for said reel shaft, a pivotable member adjustably movable in said arcuate slot, one of said reel-supporting members fastened to said pivotable member, a sheave and a sprocket on said pivotable member, a chain extending between the sprocket on the reel shaft and the sprocket on the pivotable member, a driving sheave mounted on said frame at the center point for the said arcuate slot, and a belt extending between said driving sheave and the sheave on said pivotable member.

10. A harvester comprising a frame having an arcuate slot therein, a reel adjustably mounted both vertically and horizontally with respect to said frame, the said reel having a central shaft, a sprocket on said shaft, supporting members for said reel shaft, a pivotable member adjustably movable in said arcuate slot, one of said reel-supporting members fastened to said pivotable member, a sheave and a sprocket on said pivotable member, a chain extending between the sprocket on the reel shaft and the sprocket on the pivotable member, a driving sheave mounted on said frame at the center point for the arcuate slot formed in said frame, a belt extending between the driving sheave and the sheave on said pivotable member, and means for swinging the reel about the pivotable member, whereby the said chain joining the said sprockets remains a constant length.

11. A harvester comprising a frame having an arcuate slot, a reel adjustably mounted both vertically and horizontally with respect to said frame, the said reel having a central shaft, a sprocket on said shaft, supporting members for said reel shaft, a pivotable member adjustably movable in said arcuate slot, one of said reel-supporting members fastened to said pivotable member, a sheave and a sprocket on said pivotable member, a chain extending between the sprocket on the reel shaft and the sprocket on the pivotable member, a driving sheave mounted on said frame at the center point of said arcuate slot, a belt extending between the driving sheave and the sheave on said pivotable member, means for swinging the reel about the pivotable member, and further means for adjusting the pivotable member within said arcuate slot, whereby said chain and said belt remain at constant fixed lengths.

12. A harvester comprising a frame, a reel mounted for movement with respect to said frame, driving means for said reel, means associated with said frame for effecting arcuate horizontal reel adjustment, said means comprising the frame having opposed concentric arcuate slots, and means for separately adjusting at one side of the frame each end of the reel in one of said slots at any preselected position.

13. A harvester comprising a frame having opposed concentric arcuate slots, a reel, a reel-supporting member, support arms for said reel, said supporting member engaging said slots, said arms mounted on said member, said member having a shaft portion with an enlarged flange at one end and having a superposing sleeve positioned between said frame and said flange, and means for pinching said sleeve therebetween to maintain said member in position.

REX B. HITCHCOCK.
ARTHUR H. KELLER.